United States Patent
Dikmen et al.

(10) Patent No.: US 8,160,322 B2
(45) Date of Patent: Apr. 17, 2012

(54) JOINT DETECTION AND LOCALIZATION OF MULTIPLE ANATOMICAL LANDMARKS THROUGH LEARNING

(75) Inventors: Mert Dikmen, Urbana, IL (US);
Yiqiang Zhan, Phoenixville, PA (US);
Xiang Zhou, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 931 days.

(21) Appl. No.: 12/180,674

(22) Filed: Jul. 28, 2008

(65) Prior Publication Data

US 2009/0034813 A1 Feb. 5, 2009

Related U.S. Application Data

(60) Provisional application No. 60/953,553, filed on Aug. 2, 2007.

(51) Int. Cl.
*G06K 9/00* (2006.01)

(52) U.S. Cl. ........................ 382/128; 382/160

(58) Field of Classification Search ................. 382/128, 382/160

See application file for complete search history.

(56) References Cited

U.S. PATENT DOCUMENTS

| 2005/0147303 | A1* | 7/2005 | Zhou et al. | 382/190 |
| 2007/0081712 | A1 | 4/2007 | Huang et al. | |
| 2008/0260219 | A1* | 10/2008 | Witte | 382/128 |

FOREIGN PATENT DOCUMENTS

WO 2007/036857 A2 4/2007

OTHER PUBLICATIONS

Sung et al., "Example-based learning for view-based human face detection", IEEE Transactions on Pattern Analysis and Machine Intelligence, IEEE Service Center, Los Alamitos, CA, vol. 20, No. 1, Jan. 1, 1998, pp. 39-50.
Frantz et al., "Development and validation of a multi-step approach to improved detection of 3D point landmarks in tomographic images", Image and Vision Computing, Guildford, GB, vol. 23, No. 1, Oct. 1, 2005, pp. 956-971.
Rohr, "Extraction of 3D anatomical point landmarks based on invariance principles", Pattern Recognition, Elsevier, GB, vol. 32, No. 1, Jan. 1, 1999, pp. 3-15.
International Search Report including Notification of Transmittal of the International Search Report, International Search Report, and Written Opinion of the International Searching Authority.
Dikmen et al., "Joint Detection and Localization of Multiple Anatomical Landmarks Through Learning", Proc, SPIE, vol, 6915, 691538 (2008).

* cited by examiner

*Primary Examiner* — Clayton E Laballe
*Assistant Examiner* — Leon W Rhodes, Jr.
(74) *Attorney, Agent, or Firm* — Peter Withstandley

(57) ABSTRACT

A method for detecting and localizing multiple anatomical landmarks in medical images, including: receiving an input requesting identification of a plurality of anatomical landmarks in a medical image; applying a multi-landmark detector to the medical image to identify a plurality of candidate locations for each of the anatomical landmarks; for each of the anatomical landmarks, applying a landmark-specific detector to each of its candidate locations, wherein the landmark-specific detector assigns a score to each of the candidate locations, and wherein candidate locations having a score below a predetermined threshold are removed; applying spatial statistics to groups of the remaining candidate locations to determine, for each of the anatomical landmarks, the candidate location that most accurately identifies the anatomical landmark; and for each of the anatomical landmarks, outputting the candidate location that most accurately identifies the anatomical landmark.

21 Claims, 6 Drawing Sheets

JOINT DETECTION AND LOCALIZATION OF MULTIPLE ANATOMICAL LANDMARKS THROUGH LEARNING

CROSS-REFERENCE TO RELATED APPLICATION

This application claims the benefit of U.S. Provisional Application No. 60/953,553, filed Aug. 2, 2007, the disclosure of which is incorporated by reference herein in its entirety.

BACKGROUND OF THE INVENTION

1. Technical Field

The present invention relates to landmark detection in medical images.

2. Discussion of the Related Art

In the area of medical image analysis, anatomical landmark detection often plays a fundamental and critical role. High level image analysis and understanding, e.g., segmentation [M. Rousson, A. Khamene, M. Diallo, J. C. Celi, and F. Sauer, "Constrained surface evolutions for prostate and bladder segmentation in ct images", in Computer Vision for Biomedical Image Applications, pp. 251-260, 2005], registration [Y. Zhan, Y. Ou, M. Feldman, J. Tomaszeweski, C. Davatzikos, and D. Shen, "Registering histologic and mr images of prostate for image-based cancer detection", Academic Radiology, 14, pp. 1367-1381, 2007] and computational anatomy [X. Tao, C. Davatsikos, and J. L. Prince, "Using the fast marching method to extract curves with given global properties", in Medical Image Computing and Computer-Assisted Intervention, pp. 870-877, 2007], usually starts from the identification and localization of anatomical landmarks in medical images. The accuracy of landmark detection thus becomes critical to the performance of medical image understanding.

During the last decade, methods of anatomical landmark detection have been extensively investigated. Ehrhardt et al. [J. Ehrhardt, H. Handels, B. Strathmann, T. Malina, W. Ploetz, and S. Poeppl, "Atlas-based recognition of anatomical structures and landmarks to support the virtual three-dimensional planning of hip operations", in Medical Image Computing and Computer-Assisted Intervention, pp. 17-24, 2003] used a surface based registration algorithm for detecting anatomical landmarks as an aiding mechanism for planning hip operations. A template based matching method of landmark points in the chest was used as the initial registration step in an application of nodule registration [M. Betke, H. Hong, D. Thomas, C. Prince, and J. P. Ko, "Landmark detection in the chest and registration of lung surfaces with an application to nodule registration", Medical Image Analysis 7, pp. 265-281, 2003]. Bodke et al. [A. Bodke, S. Teipel, Y. Zebuhr, G. Lesinger, L. Gootjes, R. Schwarz, K. Buerger, P. Scheltens, H. Moeller, and H. Hampel, "A new rapid landmark-based regional mri segmentation method of the brain", Journal of the Neurological Science 194, pp. 35-40, 2002] proposed a landmark-based method for segmenting four cerebral lobes of the brain in magnetic resonance imaging (M RI) scans. A clustering based method was introduced in [G. Zimmerman, S. Gordon, and H. Greenspan, "Automatic landmark detection in uterine cervix images for indexing in a content-retrieval system", in EE International Symposium on Biomedical Imaging, April 2006] for detecting cervix boundary and os, in uterine cervix images. Although these methods achieve success in specific studies, they lack in generalization capability since their design incorporates the inherent structural information that needs to be detected.

In the area of general computer vision, a widely researched topic in object detection literature is detection of faces. Several algorithms have been proposed, all of which are aimed to couple feature extraction with strong statistical pattern classification methods such as support vector machines [E. Osuna, R. Freund, and F. Girosi, "Training support vector machines: An application to face detection", IEEE Conference On Computer Vision and Pattern Recognition, pp. 130-136, 1997], fisher linear Discriminant analysis [M. Yang, N. Ahuja, and D. Kreigman, "Face detection using mixtures of linear subspaces", in Face and Gesture Recognition, p. 7076, 2000], neural networks [H. Rowley, S. Baluja, and T. Kanade, "Neural network-based face detection", IEEE Transactions on Pattern Analysis and Machine Intelligence 7 no. 1, p. 2338, 1998], multi layer perceptrons [K. Sung and T. Poggio, "Example-based learning for view-based human face detection", IEEE Transactions on Pattern Analysis and Machine Intelligence 20 no. 1, pp. 39-51, 1998] and finally a cascade of boosted weak classifiers [P. Viola and M. Jones, "Rapid object detection using a boosted cascade of simple features", in IEEE Conference on Computer Vision and Pattern Recognition 2001, p. 511, 2001].

SUMMARY OF THE INVENTION

In an exemplary embodiment of the present invention, a method for detecting and localizing multiple anatomical landmarks in medical images, comprises: receiving an input requesting identification of a plurality of anatomical landmarks in a medical image; applying a multi-landmark detector to the medical image to identify a plurality of candidate locations for each of the anatomical landmarks; for each of the anatomical landmarks, applying a landmark-specific detector to each of its candidate locations, wherein the landmark-specific detector assigns a score to each of the candidate locations, and wherein candidate locations having a score below a predetermined threshold are removed; applying spatial statistics to groups of the remaining candidate locations to determine, for each of the anatomical landmarks, the candidate location that most accurately identifies the anatomical landmark; and for each of the anatomical landmarks, outputting the candidate location that most accurately identifies the anatomical landmark.

The multi-landmark detector, the landmark specific detector and the statistics of spatial relations are each learned from training samples. The training samples comprise medical images and annotations of anatomical landmarks. The medical images comprise computed tomography (CT), magnetic resonance (MR) and positron emission tomography (PET) images.

The landmark detector is trained to treat each anatomical landmark as one class so that the medical image is scanned only once by the multi-landmark detector when it used to identify candidate locations.

The landmark-specific detector is only applied to neighboring regions of the candidate locations identified by the multi-landmark detector.

A group of the remaining candidate locations includes at least one candidate location for each of the anatomical landmarks.

In an exemplary embodiment of the present invention, a system for detecting and localizing multiple anatomical landmarks in medical images, comprises: a memory device for storing a program; a processor in communication with the memory device, the processor operative with the program to: receive an input requesting identification of a plurality of anatomical landmarks in a medical image; apply a multi-landmark detector to the medical image to identify a plurality of candidate locations for each of the anatomical landmarks; for each of the anatomical landmarks, apply a landmark-specific detector to each of its candidate locations, wherein the landmark-specific detector assigns a score to each of the candidate locations, and wherein candidate locations having a score below a predetermined threshold are removed; apply spatial statistics to groups of the remaining candidate locations to determine, for each of the anatomical landmarks, the candidate location that most accurately identifies the anatomical landmark; and for each of the anatomical landmarks, output the candidate location that most accurately identifies the anatomical landmark.

The multi-landmark detector, the landmark specific detector and the statistics of spatial relations are each learned from training samples. The training samples comprise medical images and annotations of anatomical landmarks. The medical images comprise CT, MR and PET.

The landmark detector is trained to treat each anatomical landmark as one class so that the medical image is scanned only once by the multi-landmark detector when it used to identify candidate locations.

The landmark-specific detector is only applied to neighboring regions of the candidate locations identified by the multi-landmark detector.

A group of the remaining candidate locations includes at least one candidate location for each of the anatomical landmarks.

In an exemplary embodiment of the present invention, a computer readable medium tangibly embodying a program of instructions executable by a processor to perform method steps for detecting and localizing multiple anatomical landmarks in medical images, the method steps comprising: receiving an input requesting identification of a plurality of anatomical landmarks in a medical image; applying a multi-landmark detector to the medical image to identify a plurality of candidate locations for each of the anatomical landmarks; for each of the anatomical landmarks, applying a landmark-specific detector to each of its candidate locations, wherein the landmark-specific detector assigns a score to each of the candidate locations, and wherein candidate locations having a score below a predetermined threshold are removed; applying spatial statistics to groups of the remaining candidate locations to determine, for each of the anatomical landmarks, the candidate location that most accurately identifies the anatomical landmark; and for each of the anatomical landmarks, outputting the candidate location that most accurately identifies the anatomical landmark.

The multi-landmark detector, the landmark specific detector and the statistics of spatial relations are each learned from training samples. The training samples comprise medical images and annotations of anatomical landmarks. The medical images comprise CT, MR and PET images.

The landmark detector is trained to treat each anatomical landmark as one class so that the medical image is scanned only once by the multi-landmark detector when it used to identify candidate locations.

The landmark-specific detector is only applied to neighboring regions of the candidate locations identified by the multi-landmark detector.

A group of the remaining candidate locations includes at least one candidate location for each of the anatomical landmarks.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

1. Introduction

As discussed in the Background section of this disclosure, landmark detection is a fundamental and important task in the area of medical image analysis. Reliable landmark detection paves the way to higher level analysis and understanding of medical images, e.g., segmentation, registration and image retrieval. Most of the existing studies address a specific landmark detection problem by carefully studying the appearance characteristics or shape priors of the landmarks. Although these methods achieve promising results in detecting specific landmarks, they lack the general potential to be extended to other studies.

In the following, we present a learning-based method to detect and localize multiple anatomical landmarks from medical images, in accordance with an exemplary embodiment of the present invention. The method consists of three steps. First, a multi-landmark detector is applied to roughly detect candidate locations for multiple landmarks simultaneously. The multi-landmark detector enjoys the cascaded framework from which the traditional boosted classifiers are known to gain significant run-time efficiency. Second, after the initial generation of landmark candidate locations through the multi-class classifier, the candidate points are verified via a set of landmark-specific detectors and some false detections are removed. Finally, the statistics of spatial correlations between different landmarks are used to further verify and correct the detected landmark locations. Thanks to the complete learning-based framework, this method can be potentially extended to detect anatomical landmarks in different imaging modalities. Moreover, the use of multi-class/cascaded detector architecture, as well as the computationally cheap feature extraction, facilitates highly efficient landmark detection with high localization accuracy.

2. Method 2.1 Overview

Figure 1:
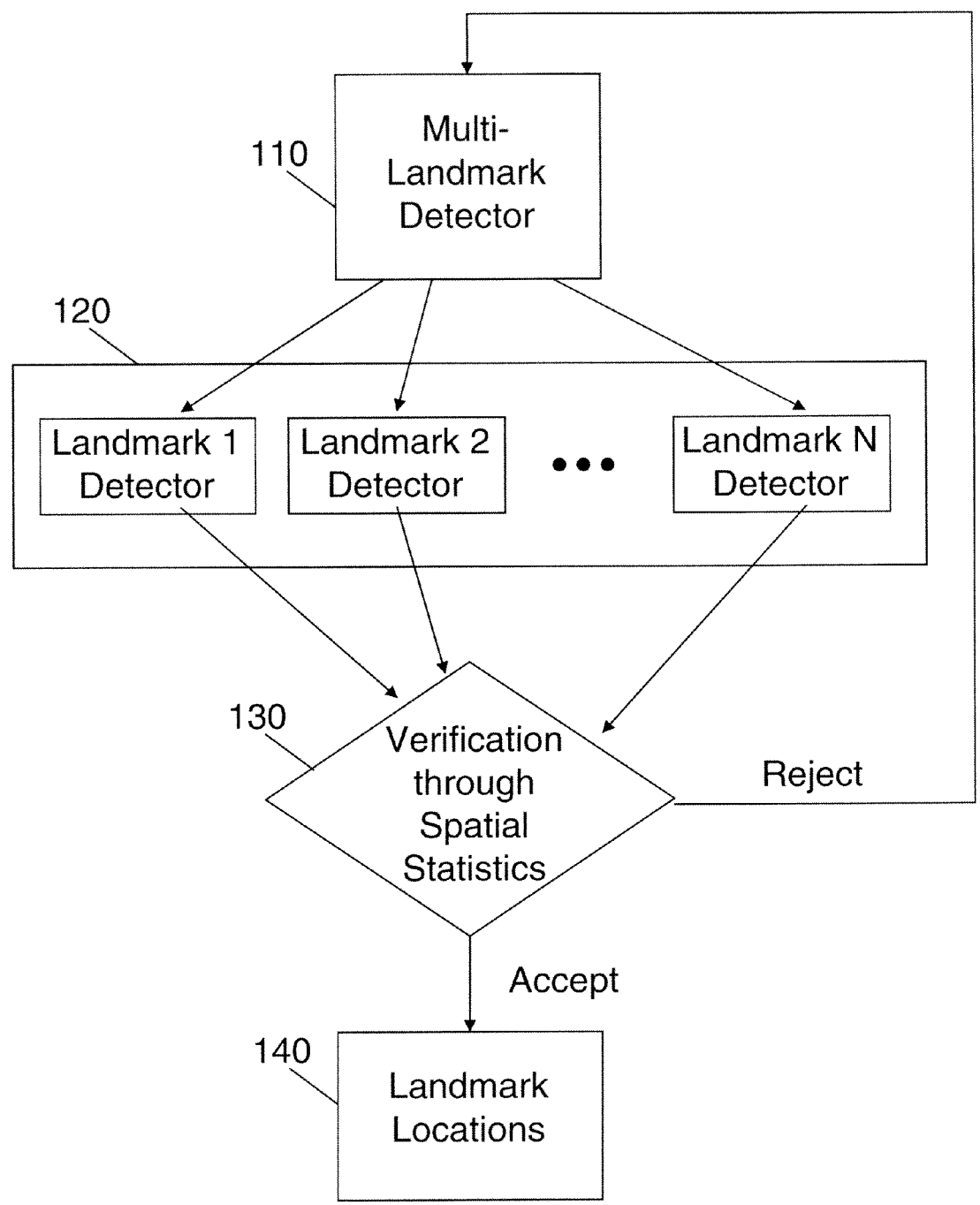
FIG. 1 shows a multi-landmark detection method according to an exemplary embodiment of the present invention.

The overview of the method can be seen in FIG. 1. It consists of three core steps. First, a multi-landmark detector is applied to roughly detect candidate locations of multiple landmarks (110). It is to be understood that prior to applying the multi-landmark detector an input is received that requests detection and localization (e.g., identification) of a plurality of anatomical landmarks in a medical image. The anatomical landmarks may be the left and right kidneys and the left lung, for example. Thus, after applying the multi-landmark detector, there may be 5 candidate locations for the left kidney, 3 for the right kidney and 7 for the left lung, for example. Second, after the initial generation of the locations of landmark candidates, the candidate points are verified via a set of landmark-specific detectors and some false detections are corrected or removed (120). Here, 3 candidates for the left kidney are removed, 1 for the right kidney and 4 for the left lung, for example. Finally, the statistics of spatial relations between different landmarks are used to further verify and correct the detected landmark locations (130). More specifically, in this step, the algorithm validates the spatial configuration of all candidate landmark sets using spatial statistics between different landmarks. A candidate landmark set consists of landmark candidates from different landmark categories. Each landmark category contributes one candidate to construct a candidate landmark set. In the above example, a candidate landmark set may consist of 1 left kidney candidate, 1 right kidney candidate and 1 left lung candidate. The candidate landmark set that has the most confident spatial configuration is output as the detected landmark locations (140), i.e., 1 for the left kidney, 1 for the right kidney and 1 for the left lung. Importantly, the key elements in each step, i.e., the multi-landmark detector, the landmark-specific detectors and the statistics of spatial relations are all learned from a set of training samples, such that the method can be applied to detect different landmarks in different medical imaging modalities.

2.2. Multi-Landmark Detector

Figure 2:
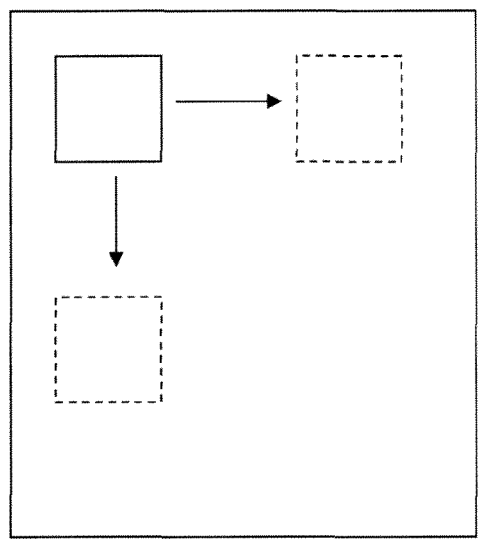
FIG. 2 shows a sliding-window scan strategy for face detection according to the prior art (a) and a sliding-window scan strategy for multi-landmark detection according to an exemplary embodiment of the present invention (b)
Figure 2:
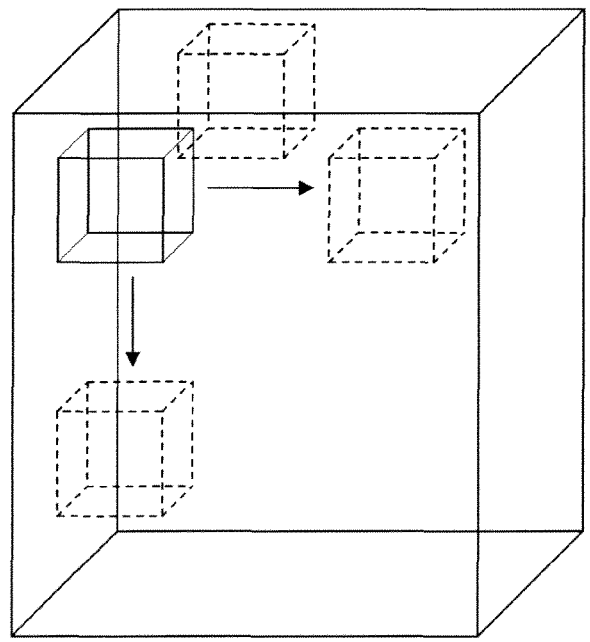

Machine learning approaches have been extensively used in the task of face detection. The approach of Viola et al. is widely popular because of its robustness and run time efficiency. It is quite natural to borrow this idea for landmark detection in medical images. The basic idea is to isolate a fixed size patch from the image, extract features that quantize the visual information in the patch and evaluate the collection of features using a classifier. The classifier responds whether the isolated patch corresponds to a face image or not. By repeating this process for all possible image patches on all location and scales (see FIGS. 2a/b) we are able to obtain the locations of the scales of the image patches created by faces. For example, in FIG. 2a, each window in the image is examined for presence of the face in Voila et al's framework. As shown in FIG. 2b, we adopt the same window based classification by scanning sub-volumes of medical images for the presence of landmarks.

The straightforward extension of Viola et al. to the multi-landmark detection problem would be to train a separate classifier for each landmark and perform multiple passes on the image volume once for each landmark. The drawback of this approach is that it results in a linear increase in running time with respect to the number of landmarks sought.

Instead, in accordance with an exemplary embodiment of the present invention, we formulate the initial stage of the multi-landmark detection as a multi-classification problem. More precisely, we train a multi-class boosted classifier [Y.-Y. Lin and T.-L. Liu "Robust face detection with multi-class boosting", in IEEE Conference on Computer Vision and Pattern Recognition 2005, pp. 680-687, 2005] that treats each landmark as one class. Therefore, during the detection procedure, it is sufficient to scan the entire image only once by a multi-class classifier to roughly locate all landmarks. As the number of landmark types increases, this approach results in a sub-linear increase in the running time of the detection system, as opposed to the linear increase that is expected when using multiple single landmark detectors.

2.3 Training of the Multi-Class Classifier

For training the classifier we first obtain numerous medical images, e.g., computed tomography (CT), magnetic resonance (MR), positron emission tomography (PET), etc., containing the landmarks of interest. In these images, we manually label center points of the landmarks. We crop a fixed size volume around these landmarks to serve as the positive samples for the particular landmark class ($\chi$). We also randomly sample volumes not containing the landmarks from the medical images as negative samples.

We collect K real valued visual features from each sample (y). Each feature corresponds to a difference of average intensities of particular regions in the sample volume. For more details on this family of volumetric features, see the description of features in [Y. Ke, R. Sukthankar, and M. Hebert, "Efficient visual event detection using volumetric features", in IEEE Conference on Computer Vision and Pattern Recognition, 2005].

The multi-class classifier is trained by the MBHboost method in Lin et al. Similar to the feature selection process of Adaboost, MBHboost automatically selects features that have the best classification performance across all classes. In this way, the appearance and shape characteristics of landmarks are automatically captured during the training stage. In run-time, the trained multi-class classifier outputs a vector with a length equal to the number of classes N (Eq. 1).

$$f(y)=[H^1(y), H^2(y), \ldots, H^N(y)] \quad (1)$$

Each element of the output vector is a simple sum of weak classifier scores (Eq. 2). $\Gamma$ denotes the set of all landmark classes.

$$H^{(x)}(y) = \sum_{i=1}^{T} h_t^x(y), x \in \Gamma \quad (2)$$

2.3.1 The Weak Classifier $h_t^\chi(y)$

We first build two histograms for each feature and landmark. From the samples, we determine the range of the values for each feature and divide these ranges into M equally spaced bins. Since generally one is expected to work with a limited amount of training data, the number of bins must be quite small to ensure the bins are meaningfully populated (in our experiments we used 8). Therefore, smoothing the histograms is not advised. The first histogram is built from samples of landmark $\chi$ and the second histogram is built from all other samples. Each sample has an associated weight that will be adjusted according to its classification accuracy in the following stages of classifier training, this is also the key idea of boosting.

A single weak classifier deals with one selected feature ($\phi(y)$). Here $\phi$ denotes the feature mapping function. The classification score is based on the ratio of the histogram bin values of the training samples belonging to the class $\chi$ and the training samples not belonging to class $\chi$ (Eq. 3)

$$h^x(y)=\ln \sqrt{p_m^{\chi+}(\phi(y))/p_m^{\chi-}(\phi(y))}, \text{ if } \phi(y) \in b_m \quad (3)$$

The purpose of boosting is to iteratively select the best weak classifier that reduces some empirical cost at each step of iteration. In our case, the cost to be minimized is the weighted sum of the Bhattacharyya distances of the histograms of positive and negative samples of each landmark class (Eq. 4).

$$h^{\chi,j}(y) = \underset{i}{\operatorname{argmin}} \sum_{\chi \in \Gamma} \Delta^\chi \times \left( \sum_{m=1}^{M} \sqrt{p_m^{\chi+}(\varphi_j(y)) \cdot p_m^{\chi-}(\phi_j(y))} \right) \quad (4)$$

where j is an index variable for the set of all features and $\Delta^\chi$ denotes the class weights at the current training iteration.

The iterative training sequence of MBHboost is outlined in algorithm 1. i is an index variable for the set of positive and negative training samples for the corresponding landmark class and $l_i^\chi$ is the binary label that denotes whether the sample $y_i^\chi$ is positive or negative.

Algorithm 1. Iteration Structure of MBH Boosting

Number of iterations := T

Total number of positive and negative samples per class $(\chi) := D^\chi$

Initialize class specific sample weights:

$w_{t=1}^\chi := \frac{1}{D^\chi} \forall \chi \in \Gamma$ for t = 1, 2, ... T do Minimize Eq. 4

Compute and register the weak classifier parameters by Eq. 3

Update the sample weights: $w_{t+1}^\chi(i) \leftarrow w_t^\chi(i) \exp(-l_i^\chi h_t^\chi(y_i^\chi))$ $Z_t^\chi = \sum_{i=1}^{D_\chi} w_{t+1}^\chi(i)$ $w_{t+1}^\chi(i) \leftarrow w_{t+1}^\chi(i) / Z_t^\chi$ end for

2.3.2 Multi-Class Cascade Architecture

Figure 3A:
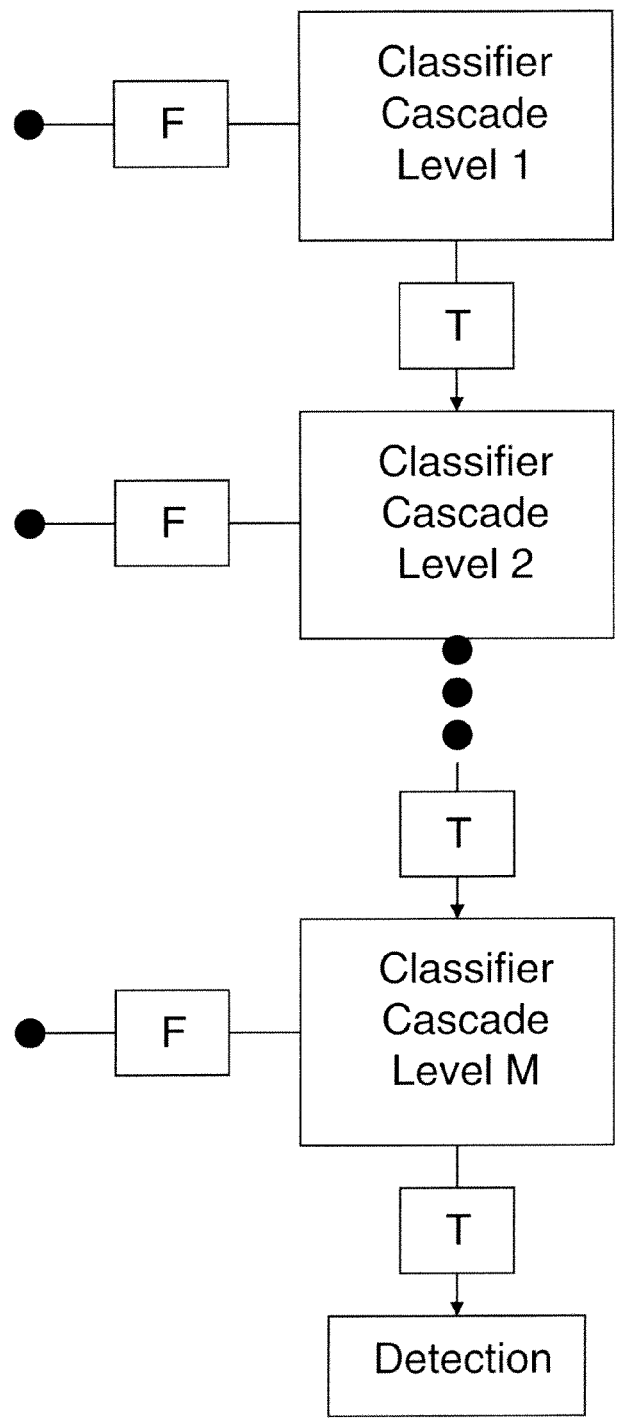
FIG. 3A shows a cascade architecture for landmark-specific detectors according to the prior art.
Figure 3B:
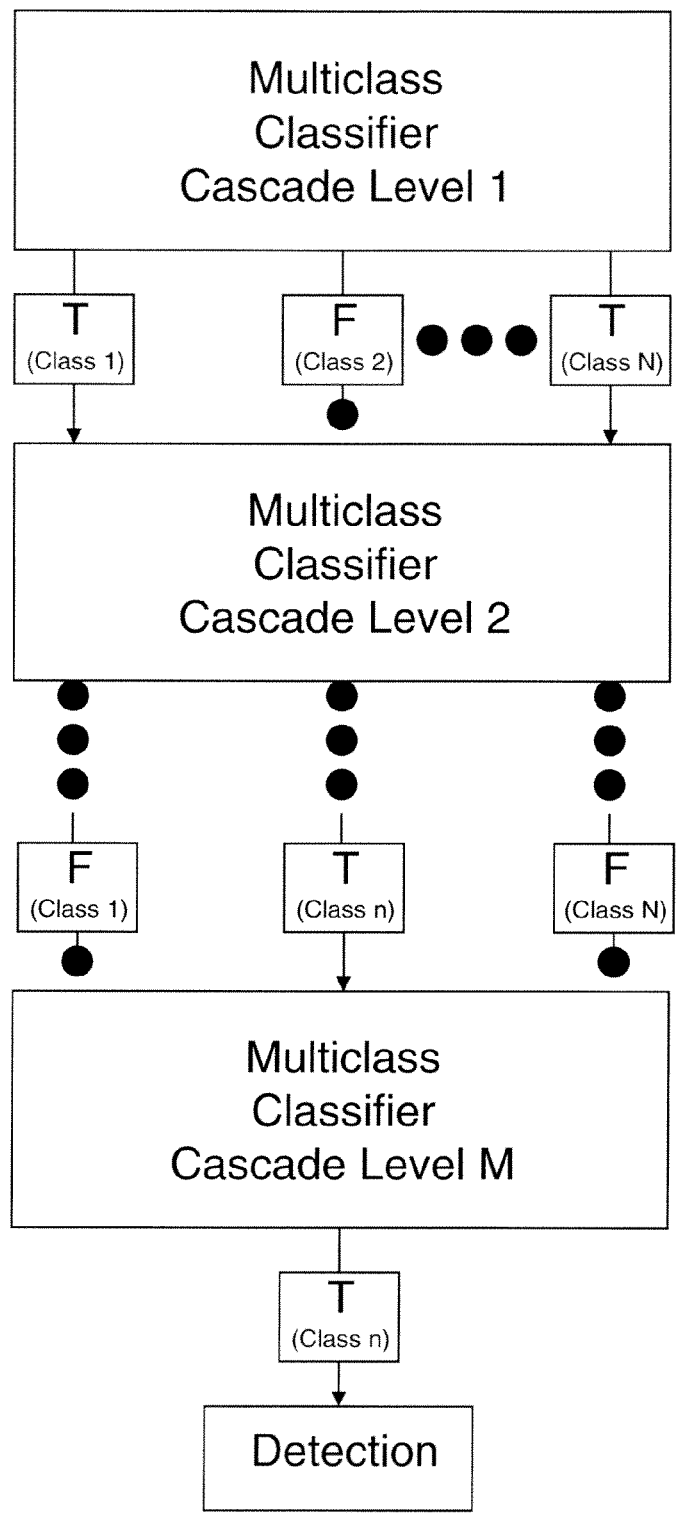
FIG. 3B shows a cascade architecture for a multi-landmark detector according to an exemplary embodiment of the present invention.

To achieve run time efficiency, the multi-class detector has a cascade framework as shown in FIG. 3B, where each stage consists of a multi-class boosted classifier. The multi-class classifier assigns (true/false) outputs for each different class individually. If one class is rejected at any stage of the cascade, it is labeled as not existent and is not checked in the following stages of the cascade. If a class is marked true by all multi-class classifiers in the cascade, it is marked as present at the scanned position. In this way, the run-time efficiency is highly increased.

2.4 Landmark Specific Detector

After generating the candidate locations of the landmarks, the candidate points are verified and corrected via a set of landmark-specific detectors. Each landmark-specific detector uses a binary classifier to identify the most likely position of a specific landmark. The binary classifier is trained by the AdaBoost algorithm [Y. Freund and R. E. Schapire, "A decision theoretic generalization of on-line learning and an application to boosting", in Computational Learning Theory: Second European Conference, EuroCOLT '95, pp. 23-37, Springer Verlag, 1995]. The strong classifier is a linear combination of weak classifiers (Eq. 5). Each weak classifier is a stump classifier applied on a selected feature (Eq. 6).

$$H(y) = \sum_{t=1}^{T} \alpha_t h_t(y) \quad (5)$$

$$h(y) = \begin{cases} 1 & \rho_i y_i \geq c_i \\ 0 & \rho_i y_i < c_i \end{cases} \text{ where } \rho_i \in \{-1, 1\} \quad (6)$$

Every landmark specific detector also has a cascaded architecture, where the subsequent classifiers are not invoked, if a previous stage found no positive detection (FIG. 3A).

It is worth noting that a coarse-to-fine framework is employed to combine multi-landmark and landmark-specific detectors. In using the multi-landmark detector, the entire image is subsampled and evaluated at a very coarse resolution. After the candidate positions are detected, the landmark specific detectors are only invoked in the local range around the candidate positions to verify and correct the landmark detection. There are two motivations for using this coarse-to-fine framework. First, as the entire volume is only evaluated at the coarsest scale, the computational cost is dramatically reduced. Second, since the single landmark detectors are expected to run close to the actual location of the landmark, they are trained with samples picked from the neighborhood of the ground truth points. This increases the localization accuracy of the landmark-specific detectors.

2.5 Verification through Spatial Statistics

Once the scale and a reference point are set, the possible locations of landmark points in the human body are rather limited. We aim to take advantage of this geometric property in order to eliminate the possibility of the detection system converging to a locally optimal configuration (e.g., one landmark is mislocated, while all others are at correct locations). The distribution of the relative landmark locations is assumed to follow a multivariate Gaussian distribution, whose parameters can be inferred from the training data in a straightforward manner. This multivariate Gaussian of (N×3, where N is the number of the landmarks) dimensions in reality has a much lower intrinsic dimensionality due to the rigidity of the geometric configuration. The basic vectors of the subspace are calculated by principle component analysis (PCA), by selecting the eigenvectors, whose eigenvalues constitute more than 90% of the energy of the original distribution.

The strength of the configuration given by the landmark detection system is assessed by finding the Mahalanobis distance to the subspace. If this distance is greater than a predetermined threshold, the configuration is marked faulty. The landmark verification is invoked exclusively to all combinations of different candidates. The configuration, which has the minimum distance to the PCA subspace [I. Jolliffe, Principle Component Analysis, Springer Verlag, 1896] is selected. The verification stage repeats iteratively until the configuration has an acceptable distance to the subspace.

3. Results

A multi-landmark localization system has been trained for detecting 6 body landmarks: 1) carina of trachea, 2) left kidney, 3) right kidney, 4) fifth lumbar vertebra (L1), 5) left femur head and 6) right femur head. The training set consists of 60 full body scans, with each landmark location hand labeled according to the following rules: the centers of L1 and both kidneys have been marked at their geometric mid-point, the carina is marked at the middle of the trachea wall, where the airway splits, and finally the femur heads are marked at the topmost location with respect to virtual coordinates.

3.1 Landmark Localization

Figure 4:
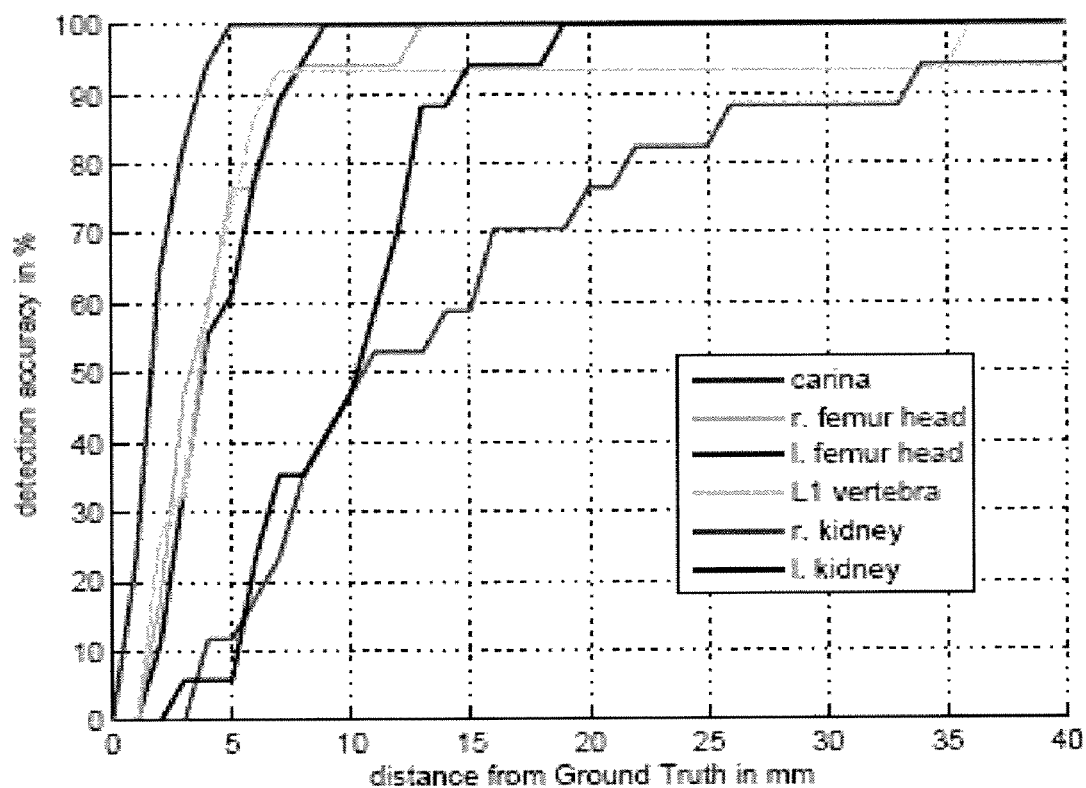
FIG. 4 shows experimental results of a multi-landmark detection method according to an exemplary embodiment of the present invention applied to real-world body scans.

The localization and detection accuracy of the landmark detection system have been validated on 18 full body scans. Please refer to FIG. 4 for a discussion of results. For example, FIG. 4 visualizes the localization accuracy of the landmark detection system. The plot therein shows the percentage of detections, whose distances are less than or equal to a given distance to the hand labeled ground truth. From FIG. 4 it can be seen that most landmarks (>90%) have been successfully localized within a centimeter of the original ground truth. The two kidneys show a lower localization performance probably due to small ambiguities in determining the absolute center of each kidney during hand labeling. It must also be noted that all landmarks but the left femur head were missed in one particular image because the scan width was too small, thus features collected around these landmarks contained too much non-body information.

3.2 Scan Section Identification

At the output of the multi-class classifier (first stage) we roughly know the locations of the body landmarks. We can use this information only to quickly determine which section of the body the current image volume comes from (e.g., entire body, abdomen, chest, pelvis).

The scan section identification experiments have been run on partial and full body scans. The total number of scans is 34. Note that we only apply the multi-class classifier to these images and make the decision based on its output. Therefore, the evaluation time is extremely fast. For recognizing which section of the body the current image volume contains, we devised a simple rule based decision principle: if all the present landmarks in the partial scans have been detected and there are no false detections for absent landmarks, the scan section is considered correctly recognized; otherwise, we label it as misidentified. In some cases it may still be possible to deduce the section of the scan even though a few landmarks are missed due to those landmarks being too close to the boundary of the image. For example, consider our landmark detector has returned detections for all landmarks but the right femur head. In this case, we have reasonable confidence that this is a full body scan. The results can be seen below in Table 1.

TABLE 1

| Scan Section | All Landmarks Detected | Landmarks Partially Detected | Incorrect Scan Section |
|---|---|---|---|
| Full Body | 17 | 0 | 1 |
| Abdomen | 6 | 2 | 0 |
| Chest | 5 | 1 | 0 |
| Pelvis | 6 | 0 | 1 |

Table 1 illustrates scan section recognition performance. The first column shows the number of test scans where all landmarks present in the scan were correctly detected. The second column shows the scans where a landmark present was missed but the scan section was judged correctly. The third column shows the number of samples, where the scan section was not identified correctly.

Described above is a learning-based method for multi-landmark detection and localization, according to an exemplary embodiment of the present invention. Different from existing landmark detection methods, our method has a learning-based framework, which facilitates the method to detect different landmarks in different kinds of imaging modalities. Using multi-class boosting, cascade architecture and coarse-to-fine framework, the method is able to localize multiple landmarks accurately with high run time efficiency.

For example, as presented above, the method has very good localization accuracy due to coarse-to-fine search architecture and learned classifiers, which can be specifically trained for localizing the landmark in its neighborhood, so it is geared towards distinguishing similar structures in the neighborhood from the actual landmark. On the other hand, our method gains its strength from learning, where the structure of the landmarks to be detected are automatically detected from a database of examples. Therefore, our method can be generalized to detect arbitrary landmarks as long as the visual characteristics are similar for all humans.

A system in which exemplary embodiments of the present invention may be implemented will now be described.

Figure 5:
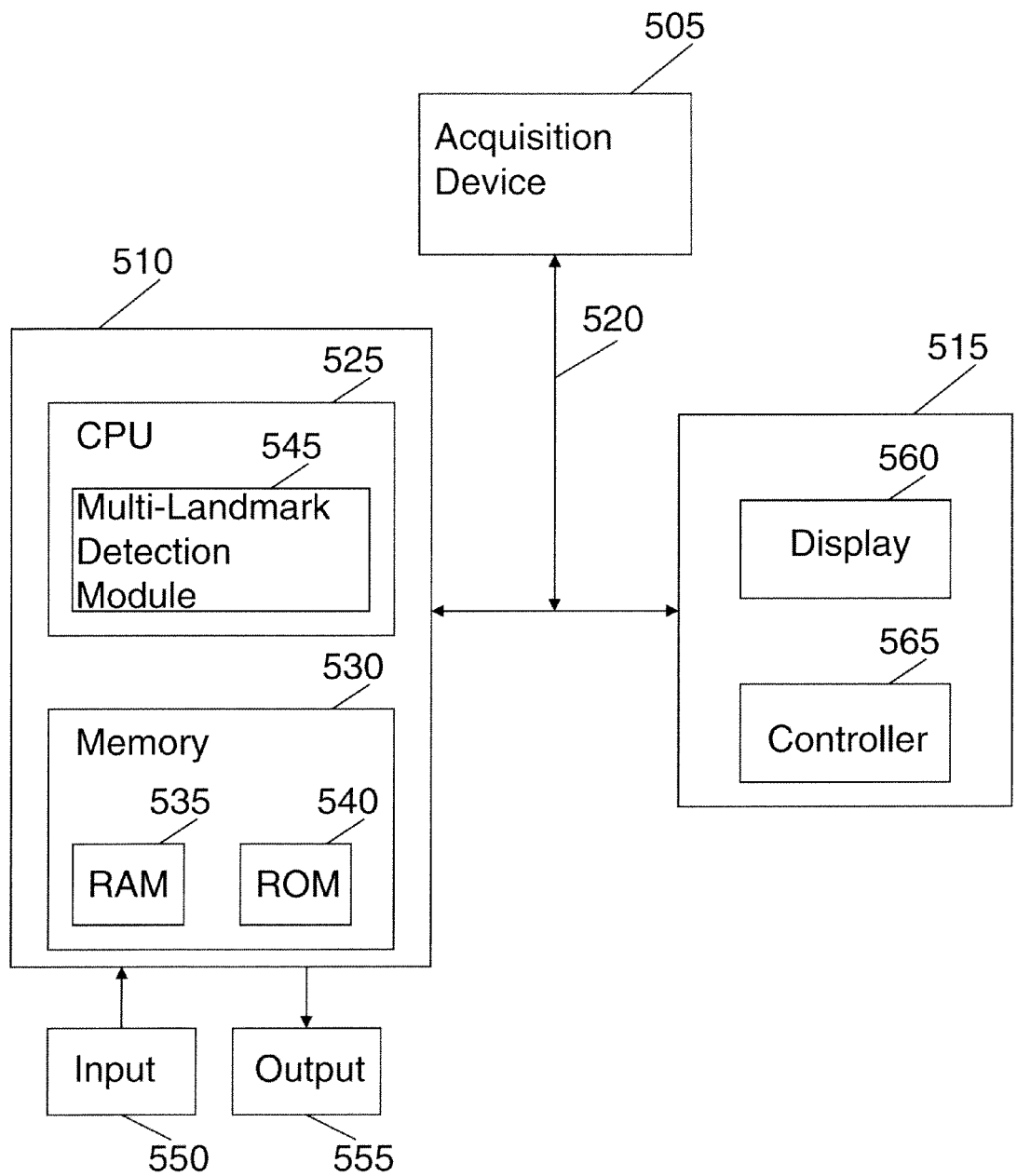
FIG. 5 shows a system in which exemplary embodiments of the present invention may be implemented.

As shown in FIG. 5, the system includes an acquisition device 505, a personal computer (PC) 510 and an operator's console 515 connected over a wired or wireless network 520. The acquisition device 505 may be a CT imaging device or any other three-dimensional (3D) high-resolution imaging device such as an MR or PET scanner.

The PC 510, which may be a portable or laptop computer, a medical diagnostic imaging system or a picture archiving communications system (PACS) data management station, includes a central processing unit (CPU) 525 and a memory 530 connected to an input device 550 and an output device 555. The CPU 525 includes a multi-landmark detection module 545 that includes software for executing methods in accordance with exemplary embodiments of the present invention.

The memory 530 includes a random access memory (RAM) 535 and a read-only memory (ROM) 540. The memory 530 can also include a database, disk drive, tape drive, etc., or a combination thereof. The RAM 535 functions as a data memory that stores data used during execution of a program in the CPU 525 and is used as a work area. The ROM 540 functions as a program memory for storing a program executed in the CPU 525. The input 550 is constituted by a keyboard, mouse, etc., and the output 555 is constituted by a liquid crystal display (LCD), cathode ray tube (CRT) display, printer, etc.

The operation of the system can be controlled from the operator's console 515, which includes a controller 565, e.g., a keyboard, and a display 560. The operator's console 515 communicates with the PC 510 and the acquisition device 505 so that image data collected by the acquisition device 505 can be rendered by the PC 510 and viewed on the display 560. The PC 510 can also be configured to operate and display information provided by the acquisition device 505 absent the operator's console 515, by using, e.g., the input 550 and output 555 devices to execute certain tasks performed by the controller 565 and display 560.

It is understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is also understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It is further understood that the above description is only representative of illustrative embodiments. For convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for detecting and localizing multiple anatomical landmarks in medical images, comprising:
  receiving an input requesting identification of a plurality of anatomical landmarks in a medical image;
  applying a multi-landmark detector to the medical image to simultaneously identify a plurality of landmark candidate locations for each of the plurality of anatomical landmarks;
  for each of the anatomical landmarks, applying a landmark-specific detector to each of its landmark candidate locations, wherein the landmark-specific detector assigns a score to each of the landmark candidate locations, and wherein landmark candidate locations having a score below a predetermined threshold are removed;
  automatically calculating spatial statistical correlation of each landmark candidate location based upon each of the remaining candidate locations to determine, for each of the anatomical landmarks, the candidate location that most accurately identifies the anatomical landmark; and
  for each of the anatomical landmarks, outputting the landmark candidate location that most accurately identifies the anatomical landmark.

2. The method of claim 1, wherein the multi-landmark detector, the landmark specific detector and the statistics of spatial relations are each learned from training samples.

3. The method of claim 2, wherein the training samples comprise medical images and annotations of anatomical landmarks.

4. The method of claim 3, wherein the medical images comprise computed tomography (CT), magnetic resonance (MR) and positron emission tomography (PET) images.

5. The method of claim 2, wherein the landmark detector is trained to treat each anatomical landmark as one class so that the medical image is scanned only once by the multi-landmark detector when it used to identify candidate locations.

6. The method of claim 1, wherein the landmark-specific detector is only applied to neighboring regions of the candidate locations identified by the multi-landmark detector.

7. The method of claim 1, wherein a group of the remaining candidate locations includes at least one candidate location for each of the anatomical landmarks.

8. A system for detecting and localizing multiple anatomical landmarks in medical images, comprising:
  a memory device for storing a program;
  a processor in communication with the memory device, the processor operative with the program to:
    receive an input requesting identification of a plurality of anatomical landmarks in a medical image;
    apply a multi-landmark detector to the medical image to simultaneously identify a plurality of candidate locations for each of the plurality of anatomical landmarks;
    for each of the anatomical landmarks, apply a landmark-specific detector to each of its candidate locations, wherein the landmark-specific detector assigns a score to each of the candidate locations, and wherein candidate locations having a score below a predetermined threshold are removed;
    automatically calculate spatial statistical correlation of each landmark candidate location based upon each of the remaining candidate locations to determine, for each of the anatomical landmarks, the candidate location that most accurately identifies the anatomical landmark; and
    for each of the anatomical landmarks, output the candidate location that most accurately identifies the anatomical landmark.

9. The system of claim 8, wherein the multi-landmark detector, the landmark specific detector and the statistics of spatial relations are each learned from training samples.

10. The system of claim 9, wherein the training samples comprise medical images and annotations of anatomical landmarks.

11. The system of claim 10, wherein the medical images comprise computed tomography (CT), magnetic resonance (MR) and positron emission tomography (PET) images.

12. The system of claim 9, wherein the landmark detector is trained to treat each anatomical landmark as one class so that the medical image is scanned only once by the multi-landmark detector when it used to identify candidate locations.

13. The system of claim 8, wherein the landmark-specific detector is only applied to neighboring regions of the candidate locations identified by the multi-landmark detector.

14. The system of claim 8, wherein a group of the remaining candidate locations includes at least one candidate location for each of the anatomical landmarks.

15. A computer readable medium tangibly embodying a program of instructions executable by a processor to perform method steps for detecting and localizing multiple anatomical landmarks in medical images, the method steps comprising:
  receiving an input requesting identification of a plurality of anatomical landmarks in a medical image;
  applying a multi-landmark detector to the medical image to simultaneously identify a plurality of candidate locations for each of the plurality of anatomical landmarks;
  for each of the anatomical landmarks, applying a landmark-specific detector to each of its candidate locations, wherein the landmark-specific detector assigns a score to each of the candidate locations, and wherein candidate locations having a score below a predetermined threshold are removed;
  automatically calculating spatial statistical correlation of each landmark candidate location based upon each of the remaining candidate locations to determine, for each of the anatomical landmarks, the candidate location that most accurately identifies the anatomical landmark; and
  for each of the anatomical landmarks, outputting the candidate location that most accurately identifies the anatomical landmark.

16. The computer readable medium of claim 15, wherein the multi-landmark detector, the landmark specific detector and the statistics of spatial relations are each learned from training samples.

17. The computer readable medium of claim 16, wherein the training samples comprise medical images and annotations of anatomical landmarks.

18. The computer readable medium of claim 17, wherein the medical images comprise computed tomography (CT), magnetic resonance (MR) and positron emission tomography (PET) images.

19. The computer readable medium of claim 16, wherein the landmark detector is trained to treat each anatomical landmark as one class so that the medical image is scanned only once by the multi-landmark detector when it used to identify candidate locations.

20. The computer readable medium of claim 15, wherein the landmark-specific detector is only applied to neighboring regions of the candidate locations identified by the multi-landmark detector.

21. The computer readable medium of claim 15, wherein a group of the remaining candidate locations includes at least one candidate location for each of the anatomical landmarks.

* * * * *